United States Patent [19]

Esashi et al.

[11] 3,739,998

[45] June 19, 1973

[54] REEL DRIVING DEVICE

[75] Inventors: Hanjiro Esashi; Katsuyoshi Kawamata, both of Miyagi, Japan

[73] Assignee: Sony Corporation, Tokyo, Japan

[22] Filed: Mar. 17, 1972

[21] Appl. No.: 235,647

[30] Foreign Application Priority Data

Mar. 30, 1971 Japan ............................... 46/22903

[52] U.S. Cl. ............................... 242/68.3, 242/200

[51] Int. Cl. ............................................ B65h 17/02

[58] Field of Search ................. 242/68.3, 197, 198, 242/199, 200, 46.5

[56] References Cited

UNITED STATES PATENTS

| | | | |
|---|---|---|---|
| 3,367,596 | 2/1968 | Osborn | 242/68.3 |
| 3,263,937 | 8/1966 | Kinlouckas | 242/68.3 |
| 2,676,766 | 4/1954 | Ross | 242/76 |
| 3,104,842 | 9/1963 | Loewe | 242/68.3 |

*Primary Examiner*—Stanley N. Gilreath
*Assistant Examiner*—Edward J. McCarthy
*Attorney*—Lewis H. Eslinger, Alvin Sinderbrand and Curtis, Morris & Safford

[57] ABSTRACT

A tape reel intended for use in a tape recording and/or reproducing apparatus is provided with a coaxial socket having an end wall with one or more apertures therein spaced radially from the socket axis, and the apparatus includes a reel-driving device comprising a rotated shaft which is inserted into the reel socket and which has at least one coupling pin projecting from the shaft's end surface and engaging in an aperture of the socket's end wall, such coupling pin having a peripheral surface which is undercut in the direction toward the shaft's end surface, for example, by being frusto-conical, so that the engagement of that peripheral surface with the perimeter of the aperture urges the tape reel onto the reel drive shaft in response to the rotation of the latter.

8 Claims, 4 Drawing Figures

REEL DRIVING DEVICE

This invention relates generally to tape recording and/or reproducing apparatus of the type in which the magnetic tape for use with such apparatus is wound on a reel or reels, and the invention is more particularly directed to improvements in the reel driving devices of such apparatus by which the tape reels are supported and rotatably driven.

Various arrangements have been proposed for rotatably coupling reels on which magnetic tape is wound with the reel drive shafts of tape recording and/or reproducing apparatus so that the selective rotation of one drive shaft or the other will be effective to wind the tape upon the take-up reel, or to rewind the tape on the supply reel. For example, in U.S. Patent application Ser. No. 195,393, filed Nov. 3, 1971, in the name of Katsu Inaga, and having a common assignee herewith, each of the tape reels, which may be contained in a cassette casing, is formed with a coaxial socket which is open at one end for receiving the respective reel drive shaft and the other end of the socket has an end wall extending thereacross with an aperture in such end wall spaced radially from the axis of the socket to receive a coupling pin which normally projects axially from the end surface of the reel drive shaft. In the described prior arrangement, each coupling pin is slidable in an axially directed bore opening at the end surface of the reel drive shaft and a spring is provided within the bore for yieldably urging the coupling pin to project beyond the end surface and thereby expose a substantially cylindrical portion of the pin for engagement in the respective aperture of the tape reel.

The above described arrangement is generally suitable for use with tape reels contained in a cassette by reason of the fact that the sockets of the tape reels readily receive the respective reel drive shafts when the cassette is placed in its operative position on the recording and/or reproducing apparatus. If the apertures of the tape reels do not register with the respective coupling pins of the reel drive shafts when the cassette is initially placed in its operative position, the coupling pins merely retract into the respective bores. Thereafter, when rotation of the reel drive shafts is commenced, the coupling pins are urged into engagement with the respective apertures of the reels upon registration with such apertures so as to effect the desired rotatable coupling of the reels with the drive shafts. Although the described arrangement in most instances provides satisfactory rotatable coupling of the tape reels with the drive shafts, a problem is encountered when the tape tension is suddenly increased to a substantial extent for any reason whatsoever. In response to such a suddenly increased tape tension and the consequent increased resistance to rotation of the reel being driven with its drive shaft, such reel may be moved upwardly, that is, in the direction of the respective reel drive shaft, to cause undesirable axial reciprocation of the reel or, in the extreme case, to effect disengagement of the coupling pin or pins from the respective apertures of the reel so that the latter is no longer rotatably coupled with its driving shaft.

Accordingly, it is an object of this invention to provide a reel driving device for a tape recording and/or reproducing apparatus which simply avoids the foregoing disadvantage of the above previously proposed arrangement.

More specifically, it is an object of this invention to provide a reel driving device which, in response to a suddenly increased tape tension, urges each tape reel to seat more securely upon the respective reel drive shaft.

In accordance with an aspect of this invention, a reel-driving device of a tape recording and/or reproducing apparatus for use with a tape reel provided with a coaxial socket having an end wall with at least one aperture therein spaced radially from the axis of the socket, comprises a rotatable reel drive shaft which is insertable into the reel socket and has an end surface from which at least one coupling pin projects for engagement in an aperture of the socket's end wall, and such coupling pin has a peripheral surface which, at least at the side thereof facing in the direction of rotation of the drive shaft, is inclined with respect to the axis of the shaft so as to be undercut in the direction toward the end surface of the shaft, whereby the engagement of such peripheral surface of the coupling pin with the perimeter of the aperture in the socket's end wall urges the respective tape reel axially onto the reel drive shaft.

In a preferred embodiment of the invention, the peripheral surface of each coupling pin which is engageable in a respective aperture of the tape reel is frustoconical and decreases in diameter in the direction toward the end surface of the reel drive shaft for achieving the desired urging of the tape reel axially onto the reel drive shaft when the peripheral surface of the coupling pin is engaged with the respective aperture's perimeter which may be generally cylindrical or frustoconical similarly to the peripheral surface of the guide pin.

The above, and other objects, features, and advantages of this invention, will be apparent in the following detailed description of illustrative embodiments of the invention which is to be read in connection with the accompanying drawings, wherein.

Figure 1:
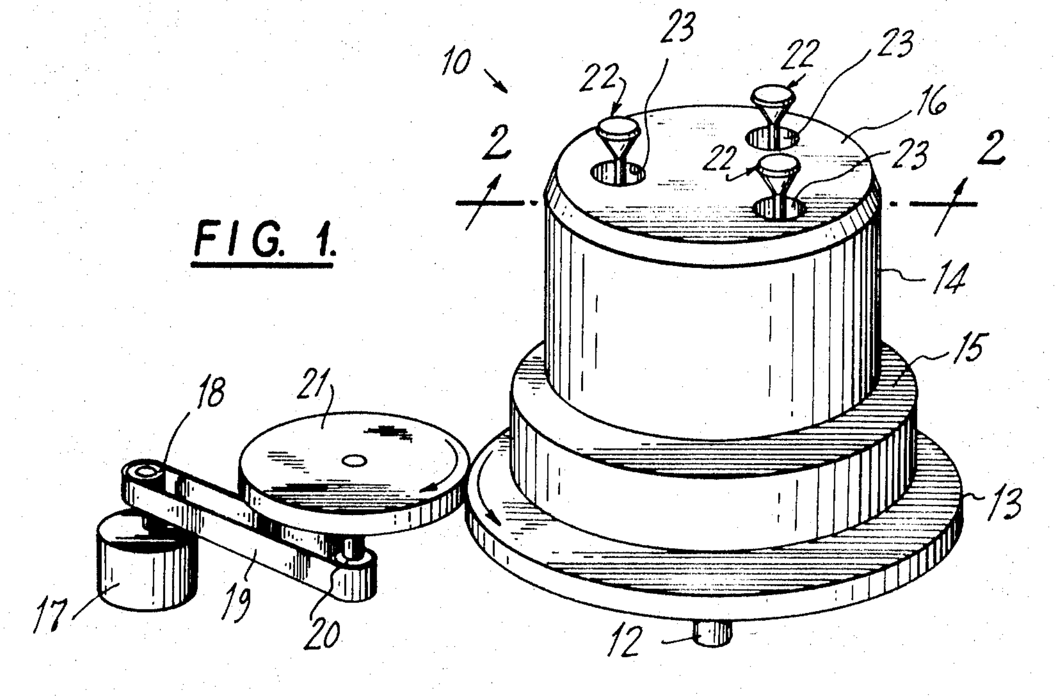
FIG. 1 is a perspective view showing a reel-driving device in accordance with an embodiment of this invention.

Referring to the drawings in detail, and initially to FIG. 1 thereof, it will be seen that a reel-driving device 10 according to this invention includes, for each of the tape reels to be rotatably supported and driven, a generally cylindrical reel drive shaft 11 which is rotatably supported at its lower end on the chassis (not shown) of the tape recording and/or reproducing apparatus, as by an axle 12. The shaft 11 is shown to be of stepped configuration to provide a driven flange 13 at its lower portion and an upper end portion 14 extending from a radial shoulder 15 to an upper end surface 16. As shown by way of example on FIG. 1, the reel drive shaft 11 may be rotated by means of an electric motor 17 having a pulley 18 fixed on its shaft and engaged by a belt 19 which runs around a pulley 20 rotatably fixed to a drive wheel 21 urged against the periphery of flange 13.

One or more coupling pins 22, for example, three coupling pins as shown on FIG. 1, project axially from the end surface 16 of reel drive shaft 11 and are spaced radially from the axis of shaft 11, preferably by the same radial distance, and also preferably equally spaced apart about such axis. As shown particularly on FIGS. 2 and 3, each coupling pin 22 is preferably slidably received in an axially directed bore 23 which opens, at its upper end, at the end surface 16, and which has a reduced diameter portion 24 cooperating with a flange 25 at the lower end of the respective coupling pin 22 for limiting the projection of the coupling pin beyond end surface 16. A helical compression spring 26 is disposed in each bore 23 under the respective coupling pin 22 for yieldably urging the latter to the position shown on FIGS. 1,2 and 3, and in which flange 25 engages against the underside of the reduced diameter portion 24 of bore 23, and hence in which a predetermined end portion of coupling pin 22 projects beyond end surface 16.

Figure 2:
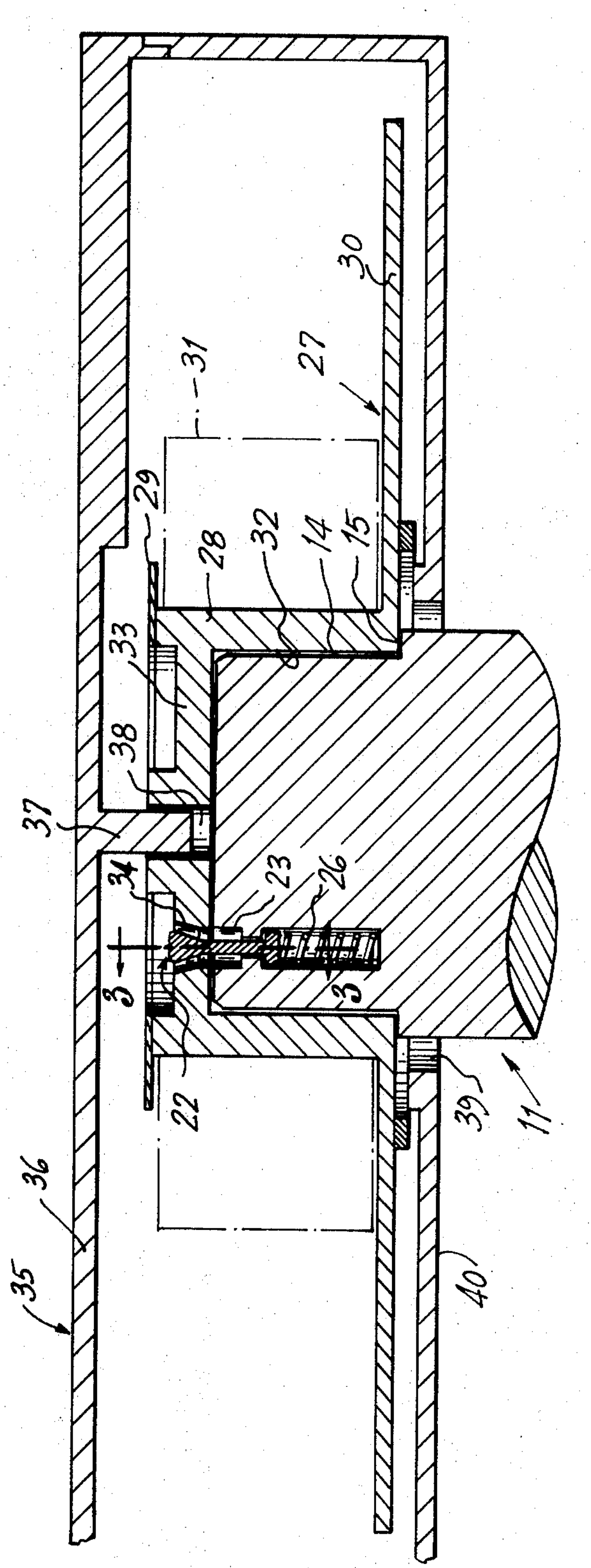
FIG. 2 is a fragmentary sectional view of the reel-driving device taken along the line 2—2 on FIG. 1, and showing such reel-driving device in engagement with a tape reel contained within a cassette.

As shown on FIG. 2, the above described reel drive shaft 11 is particularly adapted for rotatably supporting and driving a tape reel 27 having a generally cylindrical hub 28 with upper and lower flanges 29 and 30 extending radially outward from its upper and lower ends for the winding of magnetic tape (indicated in broken lines at 31) about hub 28 between flanges 29 and 30. The hub 28 is shown to have a coaxial socket 32 which is open at one end, for example, at the lower end as shown, and which has an end wall 33 extending across its other or upper end. The socket 32 is diametrically and axially dimensioned to receive end portion 14 of the respective reel drive shaft 11 with the end surface 16 of shaft 11 being either in contact with, or closely adjacent to end wall 33, as shown, when the bottom of hub 28 seats on shoulder 15. Further, end wall 33 is shown to have an aperture 34 therein spaced radially from the axis of socket 32 for receiving a respective pin 22 of reel drive shaft 11 when shaft portion 14 is received in the socket.

When reel 27 is contained in a cassette casing 35, as shown on FIG. 2, the top wall 36 of the cassette casing may have a pin 37 depending therefrom and loosely received in a central bore 38 formed in end wall 33 of reel 27 so as to loosely hold the reel at a position where the open bottom of its socket 32 is aligned with a preferably larger opening 39 provided in the bottom wall 40 of the cassette casing for permitting the respective reel drive shaft 11 to enter socket 32 through opening 39. Although FIG. 2 only shows a single tape reel 27 within cassette casing 35, it is to be understood that such cassette casing may contain two reels similarly mounted side-by-side within the cassette casing for engagement with respective reel drive shafts of the reel-driving device 10.

Figure 3:
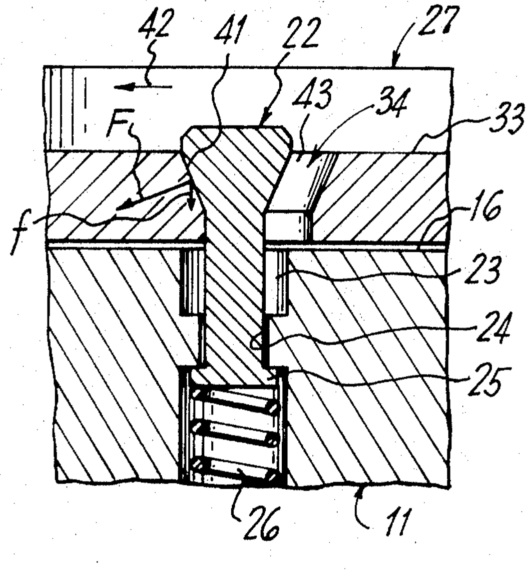
FIG. 3 is an enlarged, fragmentary sectional view taken along the line 3—3 on FIG. 2, and illustrating the manner in which the reel-driving device according to this invention is effective to urge a tape reel onto the respective reel drive shaft in response to rotation of the latter.

In accordance with the present invention, particularly as shown on FIG. 3, the portion of each coupling pin 22 which normally projects beyond end surface 16 of shaft 11 has a peripheral surface 41 which, at least at the side thereof facing in the direction of rotation of the shaft indicated by the arrow 42 on FIG. 3, is inclined with respect to the axis of the shaft so as to be undercut in the direction toward end surface 16. Thus, for example, as shown on FIG. 3 the peripheral surface 41 at the portion of coupling pin 22 normally projecting beyond end surface 16, is preferably frusto-conical and decreases in diameter in the axial direction toward end surface 16. Further, in the embodiment of the invention illustrated on FIG. 3, the perimeter of each aperture 34 in end wall 33 has a portion 43 which is frusto-conical similarly to the peripheral surface 41 of pin 22, with the smallest diameter portion of aperture 34 being at least slightly larger than the greatest diameter of the normally projecting portion of pin 22 so that the latter can freely enter the aperture 34 from below end wall 33.

When the normally projecting portion of each coupling pin 22 has a frusto-conical peripheral surface 41, as described above, rotation of shaft 11 in the direction of arrow 42 causes surface 41, at the side thereof facing in the direction of rotation, to bear against the perimeter of the respective aperture 34 and to apply a driving force F thereto having a downwardly directed component $f$ which serves to urge the reel 27 more securely downward on the respective drive shaft 11. Thus, even if the tension in the tape 31 is suddenly increased, the effect of the corresponding suddenly increased resistance to rotation of reel 27 with the respective drive shaft 11 will be merely to more securely seat the reel on the drive shaft and will overcome the tendency of the reel to raise upwardly off the drive shaft under such circumstances.

Figure 4:
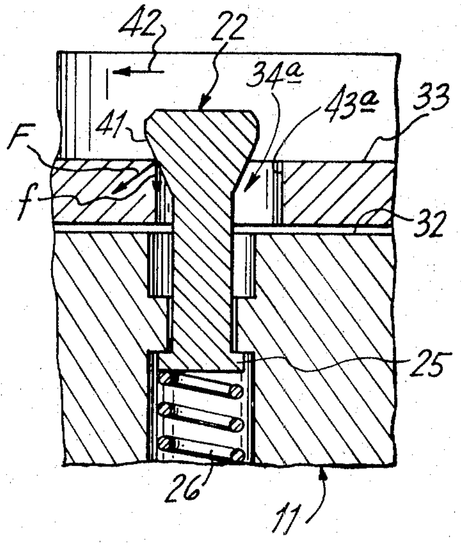
FIG. 4 is a view similar to that of FIG. 3, but showing another embodiment of this invention.

Although each aperture 34 is shown on FIG. 3 to have a frusto-conical surface portion 43 at its perimeter, reference to FIG. 4 will show that, in another embodiment of this invention which is otherwise similar to that described above with reference to FIGS. 1, 2 and 3, each of the apertures 34*a* provided in end wall 33 for receiving a respective coupling pin 22 may be formed with a cylindrical perimeter 43*a*. In the latter case, as shown, when the reel drive shaft 11 is rotated in the direction of arrow 42, the frusto-conical peripheral surface 41 on the projecting portion of pin 22 contacts the cylindrical perimeter 43*a* of aperture 34*a* at the end or edge of the latter which corresponds with the surface of end wall 33 remote from socket 32. Thus, at the line of contact of frusto-conical surface 41 with perimeter 43*a*, the driving force F applied to the tape reel will have a downwardly directed component $f$ for urging or seating the tape reel downwardly on the respective reel drive shaft.

Although the present invention has been described in connection with a reel drive shaft 11 having three coupling pins 22 projecting from its end surface 16, in which case, the end wall 33 of the respective tape reel 27 will have a corresponding number of apertures 34 or 34*a* for receiving the coupling pins, it will be noted that the reel drive shaft may be provided with only a single coupling pin projecting from its end surface, while the end wall 33 of the tape reel is provided with only a single aperture 34 or 34*a* or with a plurality of such apertures for alternatively receiving the single coupling pin.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. A reel-driving device of a tape recording and/or reproducing apparatus for rotating a tape reel provided with a coaxial socket having an end wall with at least one aperture therein which is spaced radially from the axis of the socket; said reel-driving device comprising a rotated reel drive shaft including a portion dimensioned for insertion into the reel socket and having an end surface, and at least one coupling pin projecting from said end surface and spaced radially from the axis of the shaft for engagement in an aperture of the socket's end wall when said portion of the shaft is inserted in the socket, said coupling pin having a peripheral surface which, at least at the side thereof facing in the direction of rotation of said shaft, is inclined with respect to the axis of said shaft so as to be undercut in the direction toward said end surface of the shaft, whereby the engagement of said peripheral surface of the coupling pin with the perimeter of the aperture in the socket's end wall urges the respective tape reel axially onto said reel drive shaft.

2. A reel-driving device according to claim 1, in which said peripheral surface of the coupling pin is frusto-conical and decreases in diameter in the direction toward said end surface of the reel drive shaft.

3. A reel-driving device according to claim 1, in which said portion of the reel drive shaft has an axially directed bore for each said coupling pin which opens at said end surface of the shaft and slidably receives the respective coupling pin so that the latter can retract into said bore, and spring means in said bore acting on said coupling pin for urging the latter to project beyond said end surface.

4. A reel-driving device according to claim 1, in which at least a second coupling pin, as aforesaid, projects from said end surface of the reel drive shaft to provide the latter with a plurality of said coupling pins, and said coupling pins are equally spaced apart about said axis of the shaft.

5. In a tape recording and/or reproducing apparatus: the combination of a tape reel provided with a coaxial socket having an end wall with at least one aperture therein which is spaced radially from the axis of the socket, a rotated reel drive shaft including a portion slidably received in said socket and having an end surface positioned adjacent said end wall, and at least one coupling pin projecting from said end surface and spaced radially from the axis of the shaft similarly to the radial spacing of said aperture from said axis of the socket, said coupling pin being received in said aperture and having a peripheral surface which, at least at the side thereof facing in the direction of rotation of said shaft,is inclined with respect to the axis of said shaft so as to be undercut in the direction toward said end surface of the shaft, whereby the engagement of said peripheral surface of said coupling pin with the perimeter of said aperture in the socket's end wall urges said tape reel axially onto said reel drive shaft in response to the rotation of the latter.

6. In a tape recording and/or reproducing apparatus: the combination according to claim 5, in which said peripheral surface of the coupling pin is frusto-conical and decreases in diameter in the direction toward said end surface of the reel drive shaft.

7. In a tape recording and/or reproducing apparatus: the combination according to claim 6, in which said perimeter of the aperture is substantially cylindrical and said coupling pin extends through said end wall of the socket so that said frusto-conical peripheral surface of the coupling pin is engageable with said perimeter of the aperture at the surface of said end wall remote from said socket.

8. In a tape recording and/or reproducing apparatus: the combination according to claim 6, in which said perimeter of the aperture is frusto-conical similarly to said periphery of the coupling pin.

* * * * *